United States Patent [19]
Baxter

[11] Patent Number: 5,829,373
[45] Date of Patent: Nov. 3, 1998

[54] BLIND STITCHING APPARATUS AND COMPOSITE MATERIAL MANUFACTURING METHODS

[75] Inventor: Simon Baxter, Blackburn, Great Britain

[73] Assignee: British Aerospace Public Limited Co., Hampshire, Great Britain

[21] Appl. No.: 718,309
[22] PCT Filed: Mar. 30, 1995
[86] PCT No.: PCT/GB95/00703
§ 371 Date: Sep. 30, 1996
§ 102(e) Date: Sep. 30, 1996
[87] PCT Pub. No.: WO95/27096
PCT Pub. Date: Oct. 12, 1995

[30] Foreign Application Priority Data
Mar. 31, 1994 [GB] United Kingdom ............. 9406537

[51] Int. Cl.⁶ .................. D05B 1/24; B32B 7/08
[52] U.S. Cl. .............. 112/176; 112/475.24; 156/93
[58] Field of Search ................. 112/403, 420, 112/35, 37, 171, 176, 178, 177, 198, 222, 475.24; 156/93; 428/224, 902, 908.8, 911

[56] References Cited

U.S. PATENT DOCUMENTS

| 2,257,363 | 9/1941 | Arver ................. 112/176 |
| 2,655,885 | 10/1953 | Kostro . | |
| 2,949,086 | 8/1960 | McFaddin .......... 112/475.24 |
| 3,154,034 | 10/1964 | Greco .................. 112/176 |
| 3,186,367 | 6/1965 | Greco .................. 112/176 X |
| 4,331,091 | 5/1982 | Parker et al. . | |
| 4,628,846 | 12/1986 | Vives . | |
| 4,712,495 | 12/1987 | Jagielski . | |
| 4,913,937 | 4/1990 | Engdahl et al. . | |
| 5,095,833 | 3/1992 | Darrieux . | |

FOREIGN PATENT DOCUMENTS

| 262762 | 5/1927 | European Pat. Off. . |
| 425522 | 3/1935 | European Pat. Off. . |
| 484947 | 5/1938 | European Pat. Off. . |
| 524751 | 8/1940 | European Pat. Off. . |
| 811956 | 4/1959 | European Pat. Off. . |
| 824085 | 11/1959 | European Pat. Off. . |
| 1401542 | 7/1975 | European Pat. Off. . |
| 1585885 | 3/1981 | European Pat. Off. . |
| 107910 | 5/1984 | European Pat. Off. . |
| 289343 | 7/1953 | Switzerland . |
| 92/08604 | 5/1992 | WIPO . |

Primary Examiner—Ismael Izaguirre
Attorney, Agent, or Firm—Cushman Darby & Cushman IP Group of Pillsbury Madison & Sutro LLP

[57] ABSTRACT

A composite component is made up by laying pre-forms one on top of the other and tacking the pre-forms together at spaced, discrete locations by blind stitches which tack an upper pre-form layer to the one beneath it, using a stitching head. The stitching head 16 includes a curved needle 18 reciprocally movable in one plane and a looper 30 reciprocally movable in a transverse plane. In use the looper catches the thread from the needle as it emerges from the material and draws it into a loop around the next entry point for the needle.

6 Claims, 6 Drawing Sheets

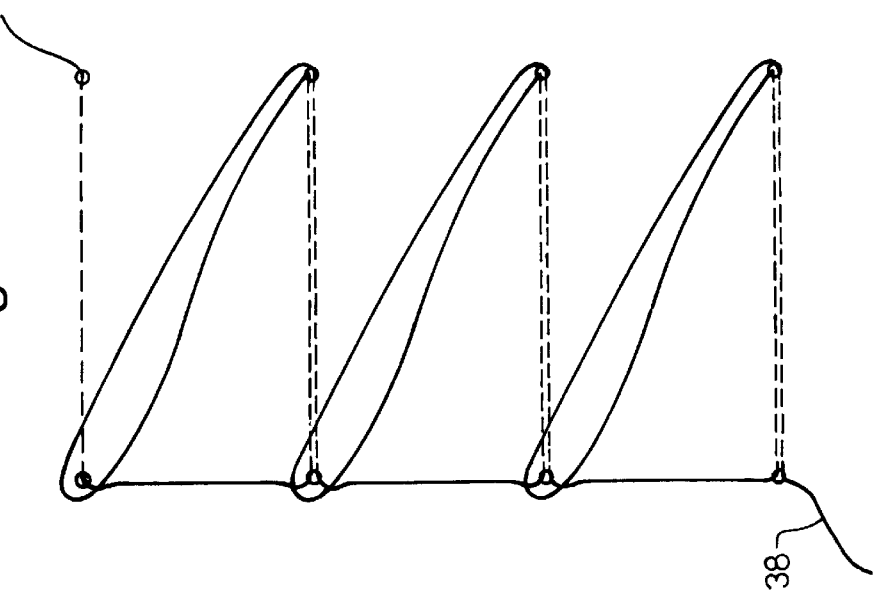
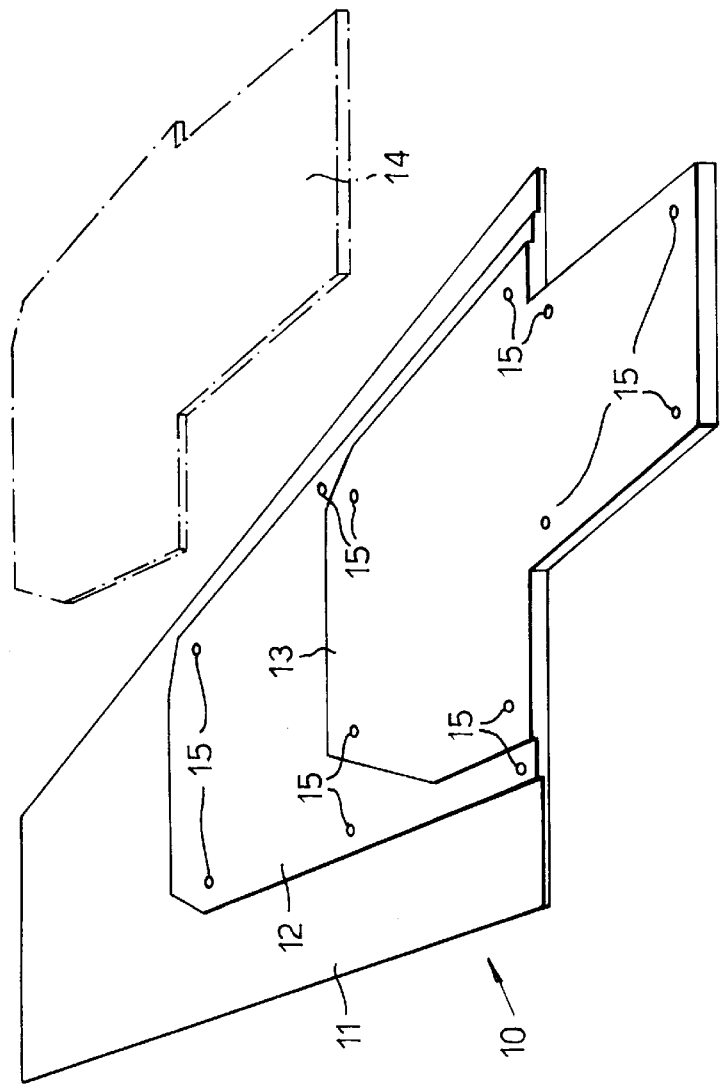

BLIND STITCHING APPARATUS AND COMPOSITE MATERIAL MANUFACTURING METHODS

BACKGROUND OF THE INVENTION

1. Field of the Invention

This invention relates to a blind stitching apparatus and in particular, but not exclusively, to such apparatus adapted for mounting on a robot arm for blind stitching of preforms of fabric for making up resin impregnated composite structures.

2. Description of Related Art

The term "blind stitching" is used to describe stitching performed where the stitching head has access to one side only of the material.

In the conventional manufacture of fibre composite materials, such as, e.g., carbon composites, a woven fibre material is pre-impregnated with a matrix material (typically thermo-setting polymers such as polyesters, phenols and epoxies). The pre-impregnated material (known as pre-preg) is cut to size and laid up in layers on a former which governs the final shape.

The lay-up is then cured in an autoclave under conditions of high temperature and pressure. However this conventional process has high costs associated with the handling and treatment of pre-preg material as well as the high cost of pre-preg material itself.

In order to reduce the cost of manufacture of composite materials, we have examined the possibility of using dry, i.e., non pre-preg, fabric, in a process where the dry fibres are processed in fabric form with the resin applied by a resin transfer moulding technique. We have noted that, to enable handling and to provide preform stability, the various fabric layers need to be joined, and we found that a single-sided blind stitching technique was particularly suitable. The advantages of a stitching technique include reinforcement in the direction of thickness of the preform; minimal inclusions in the composite; the ability to use threads compatible with the parent material, and automated stitching.

The technique of single-sided or blind stitching has been established for many years, but only for clothing or other conventional materials which are robust and which are not then subjected to impregnation or other similar processes.

A preferred requirement identified by us was for the blind stitching not to penetrate through to the other side of the material. We found that typical existing machines were not capable of stitching through only a portion of the thickness of the material, and also the feeding mechanism tended to drag the fabric and cause extensive damage to it. Furthermore, existing machines usually comprise a fixed stitching location to which the material is fed. For example, British Patent Specification 824,085 shows an arrangement in which blind stitching is achieved by folding two layers of material over a rib and stitching the folded region using a curved needle and a looper which executes a series of twisting and extending movements to provide a row of blind stitches. However in this device the material moves relative to the stitching machine and is not feasible for use where a stitching head is to apply a few stitches at spaced locations over a multi-layer pre-form.

Likewise British Patent 1,585,885 shows a stitching machine in which the material to be stitched moves relative to the machine. The machine provides regular invisible stitching between the outer and central ply of a three ply fabric. This requires the ply to be folded and does not provide blind stitching from one surface only of the workpiece.

British Patent Specification 811,956 shows an arrangement in which a curved needle co-operates with a bullet-shaped looper but the needle passes completely through the layers of material and this is not desirable for tacking together preform layers, on account of possible resin inclusions.

British Patent Specifications 524,751, 484,947, 425,522 and U.S. Pat. No. 4,712,495 all show arrangements in which a stitching machine passes a curved needle through a portion of material folded over a rib and in which the material moves relative to the machine.

British Patent 262,762 shows a shoe sewing machine which uses a curved needle and looper but in which the workpiece moves relative to the sewing machine.

U.S. Patent; and shows an arrangement in which reinforcement elements are formed in a substrate by means of a curved, hollow needle. The arrangement does not provide a looper to form secure tacks.

SUMMARY OF THE INVENTION

We have designed a blind stitching apparatus which in preferred embodiments is capable of stitching through only a part of the thickness of the material and which may be configured as a stitching head which may be moved by a preprogrammed arm to different positions over the surface of the material. The apparatus does not require the surface or support on which the material is carried to fulfill any function other than to carry the material and react to stitching loads.

Accordingly, in one aspect, this invention provides apparatus for being moved over the surface of a material and operable to apply blind stitching thereto, said apparatus comprising a stitching head having a curved needle with an eye for thread at its distal region and connected to drive means for reciprocally moving said needle in an arcuate sense, whereby in use said drive means causes said threaded needle to pierce said material at an entry point, and to surface therefrom at a spaced exit point, and looper means movable in use to catch an exposed portion of said thread adjacent said eye and to draw an amount of thread through said material to form a loop of thread adjacent said material around the next intended entry point, and means for effecting movement of said curved needle and said looper means in a predetermined sequence, to provide a stitch or tack.

It is known to connect together the plies of a multi-layer material by uniform regular stitching to provide reinforcement of the material, or to inject or otherwise insert reinforcement elements into a material, see for example British Patent Specification No. 1,401,542, U.S. Pat. Nos. 4,331, 091, 4,628,846 and 4,913,937, or published PCT Patent Application No. WO92/08604. However, none of these are suitable for, or suggest, an arrangement for building up multi-ply pre-forms in a manner which allows a reasonable degree of sheer between adjacent layers to allow them to follow a curved contour without wrinkling, and to provide pre-form stability and to maintain accuracy of ply location.

Accordingly, in another aspect, this invention provides a method of manufacturing a fibre composite article, which comprises providing at least two layers of sheet material, laying one on top of the other, connecting the layers together by a plurality of blind stitches at spaced discrete locations over the surface, applying a matrix material to said layers, and curing said article.

Whilst the invention has been described above, it extends to any inventive combination of features set out above or in the following description or claims.

BRIEF DESCRIPTION OF THE DRAWINGS

The invention may be performed in various ways and an embodiment thereof will now be described, by way of example only, reference being made to the accompanying drawings, in which:

FIG. 1 is a diagrammatic view showing how a skin of a tailplane is laid up with four layers of woven fibre material locally stitched to secure them together;

FIG. 5 is a schematic view of the stitch pattern obtained in this embodiment if the head is moved transversely between each pass of the needle through the fabric;

DETAILED DESCRIPTION OF PRESENTLY PREFERRED EMBODIMENTS

Figure 2:
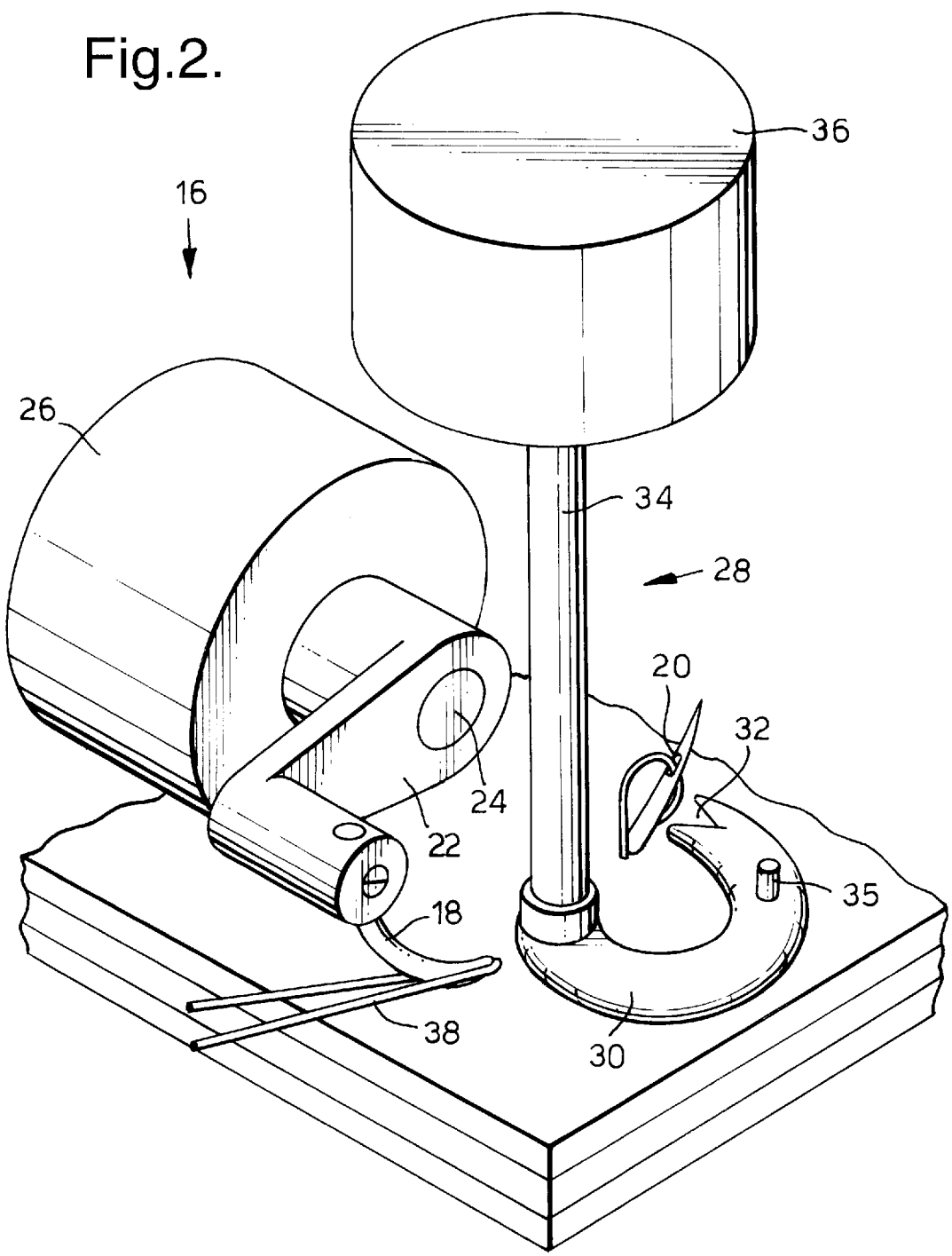
FIG. 2 is a schematic perspective view showing the juxtaposition of the primary sewing elements of an embodiment of a stitching head in accordance with the invention, with the needle just having made a first pass through the multi-layer material.

Referring initially to FIG. 1, the skin 10 of a tailplane for an aircraft is made by cutting the layers 11, 12, 13, 14 of dry carbon fibre cloth according to a pattern, laying them one by one on a support surface and tacking each layer 11–14 to the one below it at spaced points 15 around its periphery. Each tack is formed of a small number of stitches which pass completely through the upper layer, but only through part of the thickness of the lower layer, by a stitching head 16 of the type shown in FIGS. 2 to 4.

The stitching head 16 includes a curved needle 18 having an eye 20 at its distal end and connected at its proximal end to a crank arm 22 secured to the output shaft 24 of a needle stepper motor 26. The centre of curvature of the needle 18 is coincident with the rotational axis of the output shaft 24. The stepper motor 26 is controlled by a processor (not shown) to execute programmed movement synchronised with the movement of the looper 28. The needle 18 moves in a plane normal to the material to be stitched.

The looper 28 comprises a generally C-shaped arm 30 of flat section having a V-shaped thread-catching jaw 32 at its distal end and secured to the output shaft 34 of the looper stepper motor 36 at its proximal end. The upper surface of the arm carries a projecting peg 35, about two-thirds along its length, to form a loop in the thread, as to be described below. The looper arm 30 is moved by the looper stepper motor 36 between its home position (FIG. 2) and its loop-making position (FIG. 4(b)) under the control of the processor (not shown). Movement of the looper arm is in a plane generally parallel to the material to be stitched. The arm 30 is configured so that when in the loop forming position (FIG. 4(b)) it surrounds the needle entry point so that the needle 18 may pierce the material within the formed loop without hitting the arm.

The stitching head 16 includes a presser foot (not shown) for pressing the material near the intended entry point, a bobbin (not shown) for thread, and a thread cutter (not shown) for cutting the thread beyond the eye. The stitching head 16 includes a degree of compliance to accommodate changes in thickness of material and variations in contour and to ensure that the material is compressed to substantially the same extent before each stitch. The head also allows adjustment of the depth of stitch so that, where required, the stitch passes only part way through the thickness of the lower layer. This may be achieved by making the presser foot adjustable for example by raising or lowering.

The stitching head 16 is mounted on a 5 or 6 axis robot arm (not shown).

The stitching sequence will now be described. The robot arm positions the stitching head 16 at the start of the required tack position and lowers the head 16 until the presser foot engages the multiple layers and the desired compression is achieved (this may be detected optically). The curved needle 18 is then advanced to pierce the fabric and emerge a short distance away (FIGS. 2 or 3(a) 3(b)), having passed completely through the top layer but only partly through the lower layer. The level of penetration into the second and third layers is arbitrary and will also vary with different fabric thicknesses. The needle is caused to draw back a short distance to create a bulge in the thread 38. As seen in FIG. 3(b), the looper arm 30 is then moved counterclockwise to catch in its jaw 32 the upper bulge in the thread 38 (i.e., the one that is not on the bobbin side of the eye 20). The looper arm 30 continues to move counterclockwise drawing thread from the bobbin via the needle, and the portion of thread which passes over the upper surface of the arm engages the projecting peg 35 whilst the thread over the lower surface encounters no obstacle and so a triangular loop is formed around the next intended entry point in the row of stitches.

The needle is then withdrawn to its highest point, well clear of the material. The head 16 then transverses to a position above the next intended entry point (with the triangular loop still formed). The head is then pressed against the material to compress it and the needle moved to spear the material, with the point of the needle 18 embedded in the material within the triangular loop, but the needle 20 eye still clear of the material surface (FIG. 4(b)). The looper arm 30 then moves clockwise leaving the loop encircling the needle 18. The bobbin is then driven to draw thread back through the needle eye 20 and take up the slack in the loop so that the loop becomes tight around the needle. The needle is then advanced through the material and emerges laterally, carrying thread with it (FIG. 3(a)). The needle withdraws slightly to create a bulge, the looper arm then catches the bulge, and these steps are repeated until the row of stitches is complete. The cutting mechanism is then operated and the stitching head moved to the next tack location. A schematic representation of the stitch pattern is shown in FIG. 5.

Once the layers of material have been tacked together, the preform is stable and can be handled and stored until processing is required.

Further processing involves locating the preform on a tool surface, applying resin by a suitable technique, for example a resin transfer moulding technique, and then curing the component with high temperature and pressure.

Figure 3A:
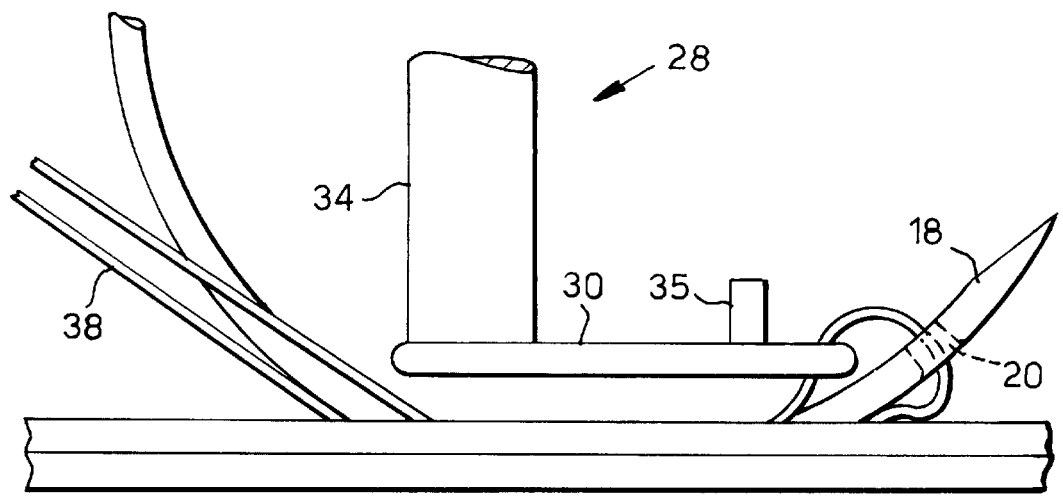
FIGS. 3(a) and 3(b) are transverse and top plan views respectively of the sewing elements of FIG. 2, but with the looper arm just catching an exposed portion of the thread.
Figure 3B:
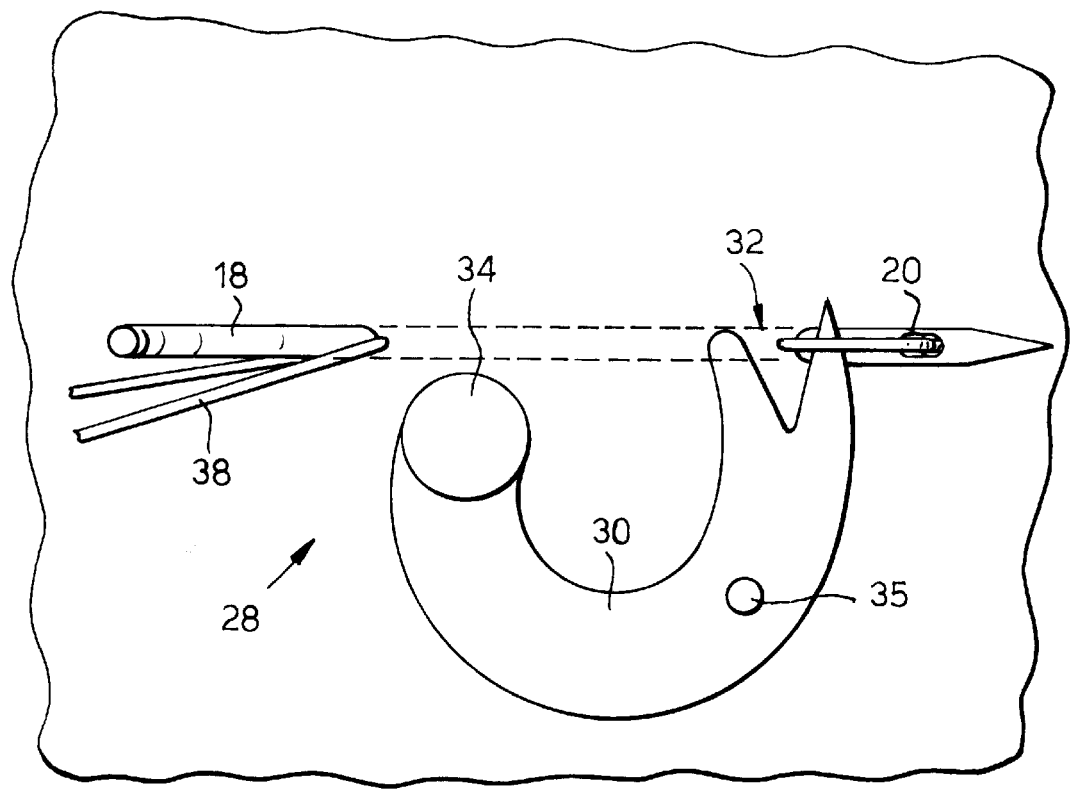
Figure 4A:
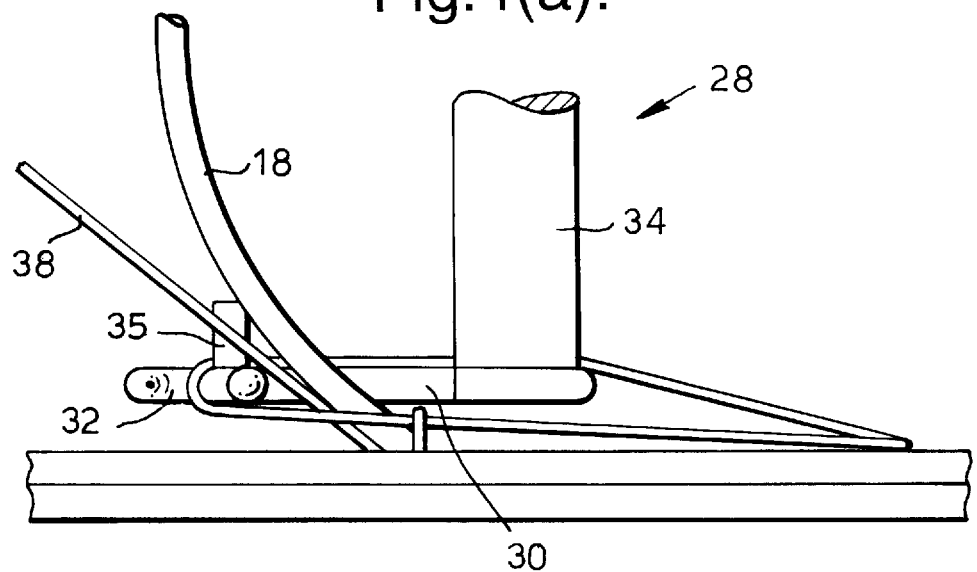
FIGS. 4(a) and (b) are transverse and top plan views respectively showing the sewing elements of FIGS. 2, 3(a) and 3(b), with the looper having made a triangular loop and the stitching head having moved transversely and the needle just having pierced the material at the next needle entry point.
Figure 4B:
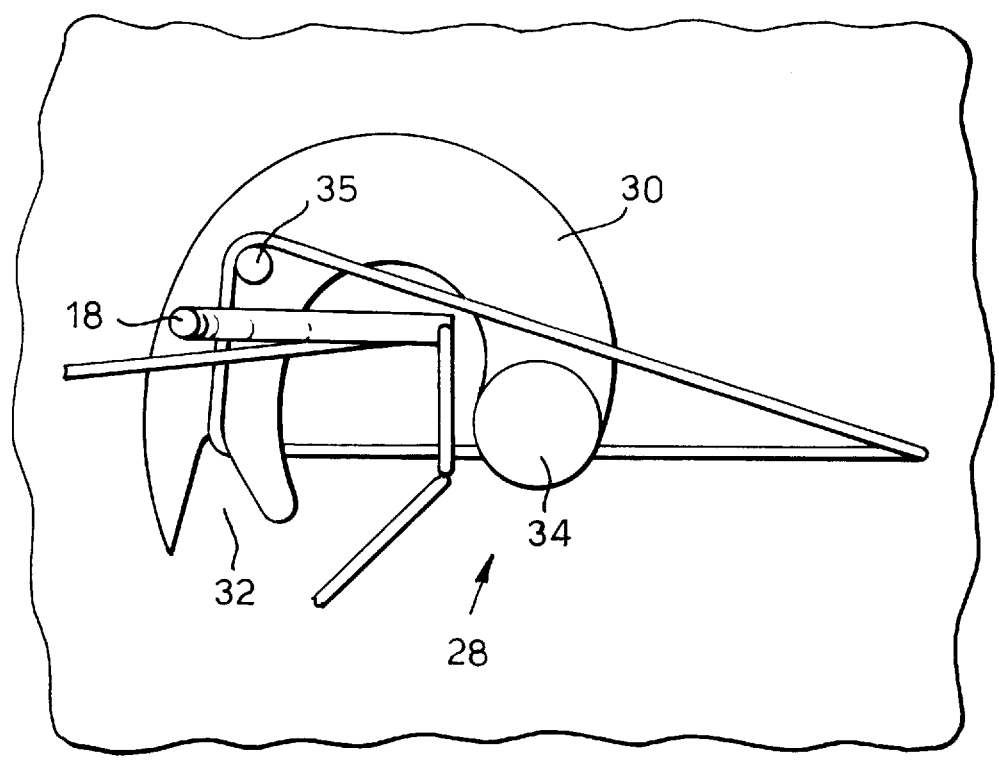
Figure 6:
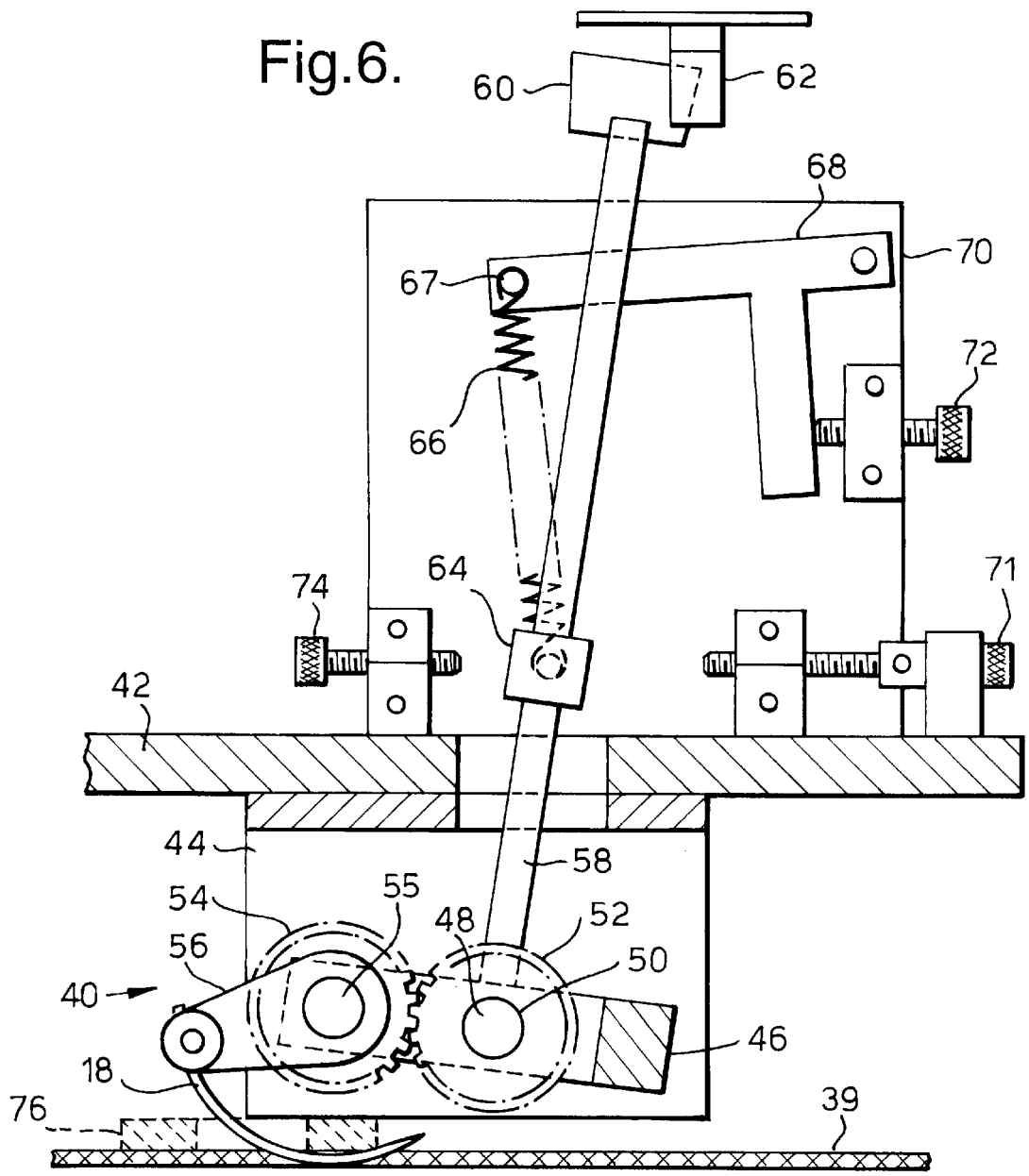
FIG. 6 is a schematic side view of a second embodiment of stitching head of this invention which incorporates a needle compensator arrangement to allow resilient movement of the needle assembly.

Referring now to FIG. 6, the second embodiment operates in a similar manner as before with sequenced movements of the curved needle 18 and a curved looper (not shown) but similar to the looper 28 shown in FIGS. 2 to 4. In this embodiment, the needle assembly 40 incorporates a degree of resilience to prevent or reduce damage to the needle 18 if it meets a patch of high resistance, for example due to variation in ply thickness of the material 39 to be stitched or needle assembly 40 vertical positioning.

The second embodiment comprises a needle assembly housing 42, only part of which is shown, to the lower side of which is mounted a support bracket 44. The bracket pivotally supports a torque arm 46 for limited resilient pivotal movement about axis 48, to be described below. The torque arm 46 rotatably supports the spindle 50 of a driven gear 52 for movement about axis 48. The drive for the gear is by means of a bevel gear (not shown) on the spindle 50, driven by a stepper motion (not shown).

The driven gear 52 engages another gear 54 mounted on a spindle 5 to which is secured the needle crank 56, which carries the curved needle 18. Reciprocal stitching movement of the needle 18 is imparted by suitable, sequenced operation of the stepper motor (not shown), via the drive train just described.

The sub-assembly including the torque arm 46 and the elements mounted on it may therefore pivot about the axis 48. Projecting upwardly from the torque arm 46 is a torque bar 58 which carries on its free end a vane 60 which co-operates with an opto-electronic sensor 62 to signal to the control system the position of the torque bar 58.

About a third of the way up from its connection to the torque arm 46, the torque bar 58 carries a lower spring attachment 64 which connects to a tension spring 66, the upper end of which is connected to one end 67 of a T-shaped adjustment link 68, the opposite end of which is pivoted to a back plate 70. The back plate also directly or indirectly carries the opto-electronic sensor 62. The back plate and connected components may be moved relative to the assembly housing by a threaded needle height adjustment rod 71. The equilibrium tension acting in the tension spring 66 may be set by a threaded torque adjustment screw 72. The maximum downward deflection of the torque arm 46 and the components forming the associated sub-assembly may be set by a threaded needle deflection adjustment rod 74. The arrangement may incorporate a suitable pressing element for pressing the material to be stitched, such as indicated in dotted lines at 76.

Turning the needle height adjustment rod 71 in one sense will shift the plate 70 to the right as viewed thus raising the equilibrium position of the needle, and vice versa. Thus the second embodiment provides a resilient mounting for the needle assembly, which allows adjustment of the degree of resilience, needle height and travel. The system also allows feed back of the position of the torque bar 58/torque arm 46, and furthermore gross positional errors may be dealt with by the inherent stalling or cut out characteristic of DC stepper motors when excessive resistance is met.

Figure 7:
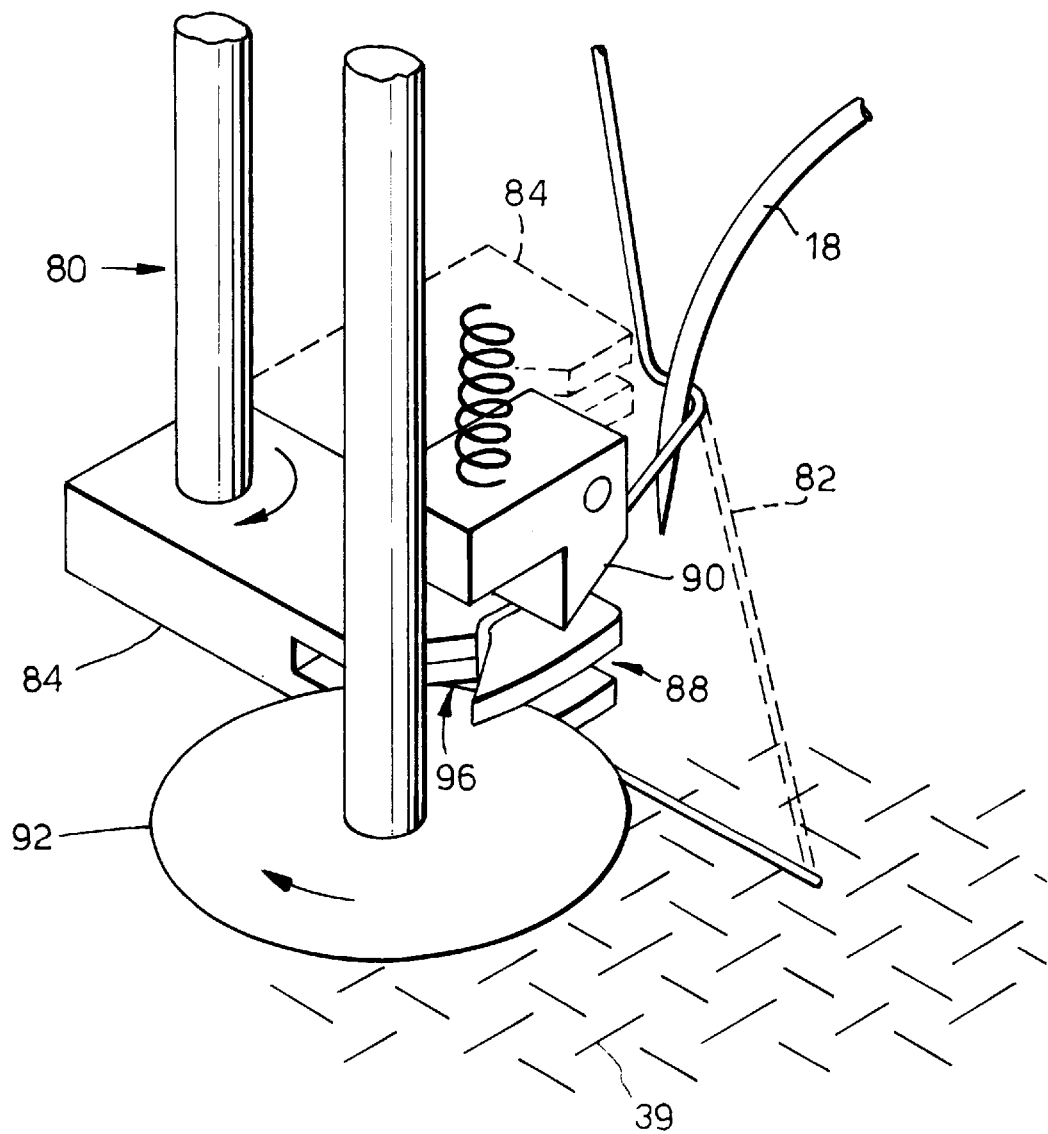
FIG. 7 is a schematic side view of a grip and cut mechanism for use with either of the above embodiments.

Referring now to FIG. 7, the grip and cut mechanism 80 is disposed to one side of the arcuate path of movement of the curved needle and moves with the stitching head and the mechanism may be operated to intercept the portion 82 of thread which extends between the material 39 and the needle 18 when the latter is withdrawn from the material, to grip and cut the thread and keep it gripped at the end of a tack or series of tacks at a location until the stitching head has begun a tack at the next location.

The mechanism 80 includes a thread catcher 84 driven by a stepper motor (not shown) between a rest position, shown in dotted lines, and the cutting/gripping position shown in solid lines. When the needle 18 is in the withdrawn position shown in FIG. 7, moving the thread catcher 84 from the rest position to its cutting/gripping position will cause it to intercept the thread portion 82 and to draw it to one side, taking thread from the bobbin via the eye of the needle 18. The thread catcher includes a V-shaped catching region 96 at one side and is split to provide a cutting slot 88. When approaching its cutting/gripping position, the upper surface of the catching region engages a spring-loaded cleat 90 temporarily to grip the thread, and shortly thereafter the gripped thread is cut by the edge of a rotating cutter disc 92.

In operation of the stitcher head with the cut and grip mechanism, on completion of a tack or series of tacks at a location, the needle 18 is withdrawn to the position shown in FIG. 7. The thread catcher 84 is rotated to grip then cut the thread and temporarily to grip the fresh free end of the thread passing through the needle. When the stitcher head has started a new stitch, so that it is no longer necessary to grip the free end, the thread catcher 84 is indexed through 270° to release the thread and place it in readiness for a next cut and grip cycle.

The described embodiments provide stitching or tacking at discrete locations of a preform, preferably in the flat, but not essentially, mainly to provide preform stability, maintain accuracy of ply location, and only tack through a short depth in order that the preform is free to drape into more complex curvatures for processing. The stitching may also act as a means of attaching other details to skins to form a component assembly. These other details might include spare, ribs, etc., and the stitching would provide a mechanism to improve peel strength at the interface between components.

The tacking positions situated strategically over the preform area consist of several stitches (this can be varied according to preform requirements), and tacking is carried out as each layer of fabric is positioned. The cut and grip mechanism has been incorporated to quickly end one tack position and allow movement to another.

The location of the tacks is to be determined by the ply geometries, but where possible, if no component structural properties are required (i.e., in areas of peel) the tacks should be placed in trim areas.

The use of only local stitching minimises weight and resin rich areas which can tend to be evident around stitch fibres.

What is claimed is:

1. An apparatus movable over the surface of a material and operable to apply blind stitching thereto, said apparatus comprising:

a stitching head having a curved needle with an eye for thread at its distal region;

drive means, connected to said stitching head, for reciprocally moving said needle in an arcuate sense and for causing said threaded needle to pierce said material at an entry point and to surface therefrom at a spaced exit point;

looper means for moving to catch an exposed portion of said thread adjacent to said eye and for drawing an amount of thread through said material to form a loop of thread adjacent to said material around the next intended entry point, the looper means including an arm of flat section and generally nonlinear form, said arm being secured to a rotary member at one end, the other end of said arm having a thread catching portion; and means for effecting movement of said curved needle and said looper means in a predetermined sequence.

2. An apparatus according to claim 1, wherein, when said looper means is in its loop forming position, the arcuate path of said needle passes between said thread-catching portion and the other end of said arm.

3. An apparatus movable over the surface of a material and operable to apply blind stitching thereto, said apparatus comprising:

a stitching head having a curved needle with an eye for thread at its distal region, said head including means for adjusting the maximum depth of a stitch sewn by said needle;

drive means, connected to said stitching head, for reciprocally moving said needle in an arcuate sense and for causing said threaded needle to pierce said material at an entry point and to surface therefrom at a spaced exit point;

looper means for moving to catch an exposed portion of said thread adjacent to said eye and for drawing an amount of thread through said material to form a loop of thread adjacent to said material around the next intended entry point; and means for effecting movement of said curved needle and said looper means in a predetermined sequence.

4. An apparatus movable over the surface of a material and operable to apply blind stitching thereto, said apparatus comprising:

a stitching head having a curved needle with an eye for thread at its distal region said stitching head being compliantly mounted to allow it to accommodate variations in thickness of the material and changes in surface profile and contour;

drive means, connected to said stitching head, for reciprocally moving said needle in an arcuate sense and for causing said threaded needle to pierce said material at an entry point and to surface therefrom at a spaced exit point;

looper means for moving to catch an exposed portion of said thread adjacent to said eye and for drawing an amount of thread through said material to form a loop of thread adjacent to said material around the next intended entry point; and means for effecting movement of said curved needle and said looper means in a predetermined sequence.

5. A method of manufacturing a fibre composite article, the method comprising:

providing at least two layers of sheet material, laying one on top of the other, connecting the layers together by a plurality of blind stitches at spaced discrete locations over the surface, applying a matrix material to said layers, and curing said article;

wherein each of said stitches has a maximum depth less than the combined thickness of the at least two layers.

6. A method of manufacturing a fibre composite article, the method comprising:

providing at least two layers of sheet material, laying one on top of the other, connecting the layers together by a plurality of blind stitches at spaced discrete locations over the surface, applying a matrix material to said layers, and curing said article;

wherein said layers are not impregnated prior to stitching.

\* \* \* \* \*